July 8, 1969
C. A. ELLERT
3,454,865
HIGH VOLTAGE REDUCING CIRCUIT USING LOW
VOLTAGE SILICON CONTROLLED RECTIFIER
Filed Sept. 27, 1966
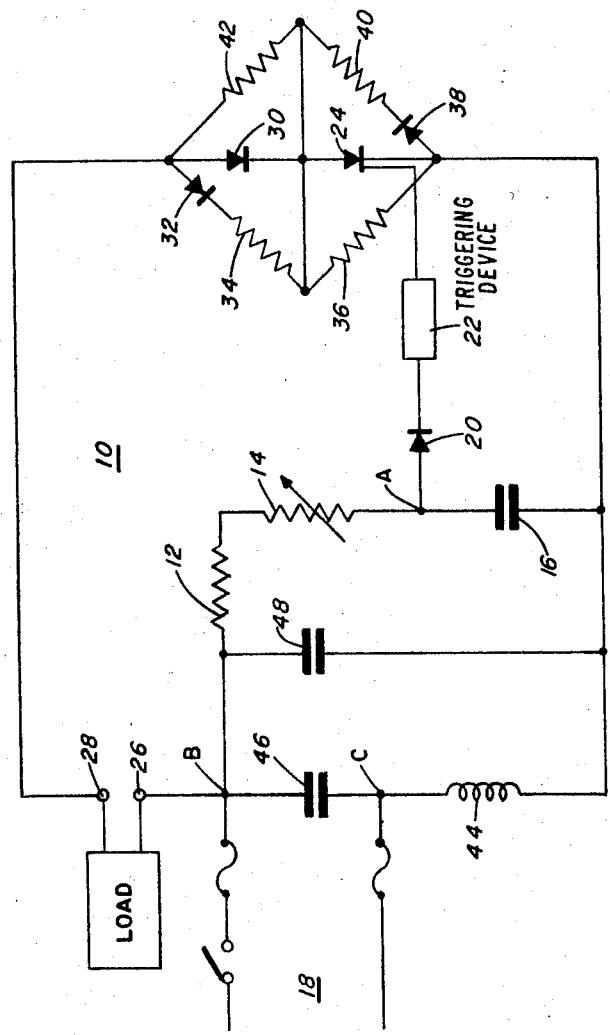
INVENTOR.
CHARLES A. ELLERT
BY
Walter G. Finch
ATTORNEY

United States Patent Office 3,454,865
Patented July 8, 1969

3,454,865
HIGH VOLTAGE REDUCING CIRCUIT USING LOW VOLTAGE SILICON CONTROLLED RECTIFIER
Charles A. Ellert, 2406 Everton Road,
Baltimore, Md. 21209
Filed Sept. 27, 1966, Ser. No. 582,348
Int. Cl. G05f *1/40, 1/52, 1/60*
U.S. Cl. 323—22                    4 Claims

ABSTRACT OF THE DISCLOSURE

A current regulating arrangement using solid state elements which permits travelers to use domestic applicances on higher voltage, foreign AC supply sources. The current is adjustably limited through gate-control of a silicon control rectifier by phase shift. In order to use less expensive low voltage silicon control rectifiers, low cost power diodes are used in series therewith and a shunting arrangement of equalizing resistors and other forward and reverse poled diodes insures the proper voltage division over all. Triggering devices are in the form of two-terminal avalanche elements, for example a four-layer Shockley diode, a biswitch or a diac, in solid state elements or a neon gas tube (which further functions as an indicator light).

---

This invention relates generally to voltage reduction devices, and more particularly it pertains to a compact power converter for operating electrical appliances on power mains of higher voltage than their ratings in an efficient manner.

It is common knowledge that if a 110-volt incandescent lamp is to operate from 220-volt source of power, it is necessary to use a step-down transformer having a suitable power rating and output voltage to accommodate the 110-volt lamp. If the lamp power requirement is beyond a few hundred watts, the step-down transformer becomes bulky and heavy. Other methods of voltage reduction such as series rheostats, or ballast resistors result in power losses which may give rise to serious heat dissipation problems and poor efficiency.

Domestic use of the power converter of this invention in the United States, is limited because of the almost universal availability of 110-volt AC power. However, a much larger area of application of the power converter exists in the foreign travel field. Many foreign travelers and tourists are unable to use their American made appliances such as heating pads, electric blankets, clothes irons, shaving water heaters, milk bottle warmers, and coffee makers, because often foreign source of electric power is 220 or sometimes 250 volts instead of 110 volts for which our American appliances are designed. With the popular use of airplanes for travel between places of interest, there is urgent need for traveling light. It is, therefore, contemplated that the present power converter of this invention will find its most beneficial application in foreign travel where lightness and compactness of a power converter is highly desirable or necessary.

The principal object of this invention is to provide a light, compact, efficient device for power conversion from a higher to a lower AC voltage which in principle of operation differs greatly from the methods previously described.

Another object of this invention is to provide for voltage variation in addition to the power conversion. This is a convenient feature in many electrical appliances. For example, in a milk bottle warmer it may be desirable to reduce the temperature to some low sustaining value as compared to a higher but normal temperature. In the case of a clothes iron, certain fabrics such as rayon require a reduced temperature of the iron as compared to cotton materials. This is a specific embodiment of the present invention.

Still another object of this invention is to provide for a highly efficient electric power converter. In the case where a step-down transformer is used for operating a 110-volt electrical device from a 220-volt source, it is not unusual to experience an overall efficiency in the order of 85%. From an engineering standpoint, a still higher efficiency is within the realm of practicability. However, to achieve this end the transformer must of necessity be even larger, heavier, and more expensive than currently available commercial models. These considerations thus operate to defeat the requirements for plane travel.

To indicate the effect of poor power efficiency, in the example of the 85% transformer, take the case of a small clothes iron consuming 660 watts. The transformer loss would be 15% or 99 watts. Power dissipation of this order requires good ventilation and care in placement away from any inflammable materials. In the case of series rheostats and ballast resistors the efficiency is only 50% with a resultant power loss of 330 watts which poses even more serious problems. Under the same circumstances the present invention would produce a dissipation of approximately 18 watts or an efficiency of about 97.3%.

Yet another object of this invention relates to economy in the cost of materials used in implementing the desired goal of the power converter of this invention. Basically, the power conversion is accomplished through the gate control of the silicon controlled rectifier (SCR). The cost of this SCR device rises rapidly as the peak inverse voltage ratings are increased. By using an inexpensive power diode in series with the SCR, together with equalizing resistors, which insure proper voltage division between the diode and the SCR, it is possible to use a low voltage SCR in a high voltage circuit, thus effecting economy in cost of the SCR.

The principle involved of the power converter of this invention is similar to that used in operating filter capacitors in series across a high voltage supply. The same idea is used in operating silicon diodes in series across an AC supply to rectify a voltage exceeding the peak inverse voltage rating of the individual diodes. For reasons well known to the art, the equalizing resistors divide the applied high voltage in a manner that permits using low voltage capacitors or diodes without exceeding the individual voltage ratings of these circuit components. This basic idea is embodied in the power converter of this invention to effect a lowering in cost of construction.

Other objects and advantages of the present invention will be apparent to those skilled in the art from a consideration of the following detailed description of one exemplary embodiment of the present invention had in conjunction with the accompanying drawing, which is a schematic wiring diagram illustrating an electric power converter embodying features of the present invention.

Referring to the drawing, there is shown an electric power converter 10 having resistors 12 and 14 serially connected with a capacitor 16 to form a phase shifting network across the AC supply main 18. By making resistor 14 variable, the phase of the voltage at point A with reference to the mains voltage can be made to vary over a relatively large angle.

The voltage at point A is applied through a diode 20 and a triggering device 22 to the gate of an SCR 24. When the amplitude of a cycle of voltage across capacitor 16 reaches the avalanche voltage of the triggering device 22, capacitor 16 discharges through the gate of an SCR 24 causing it to conduct.

Power then flows from point B through the load connected to terminals 26 and 28 through a power diode 30 and an SCR 24 back to the other side of the line at point C. Power flows only during the positive half of the AC supply because of the unilateral characteristic of diode 30 and SCR 24.

The gating voltage derived from point A is also positive-going because of the diode action of diode 20. Diode 20 also prevents the negative going voltage at point A from reaching the gate of SCR 24 and possibly damaging it. The trigger device 22 can be any two-terminal avalanche device having either a unilateral or bilateral characteristic such as a neon tube, 4-layer Shockley diode, biswitch, diac, and the like. A type NE-83 small neon tube works as well as any of the more sophisticated semiconductor devices mentioned above, and also serves as a pilot light.

In order to operate, let us say, a 110-volt appliance from a 220-volt AC source, it is necessary to hold back more than one-half of an alternation of power. To achieve the desired result, a certain shaving of the remaining half cycle of power is required. This is accomplished by phase delaying the actuating gate pulse to the SCR, and this is specifically performed by the phase delay and pulse forming circuitry described above, that is, by resistors 12, 14, capacitor 16, diode 20 and trigger device 22. By varying the resistance of resistor 14, the percentage of power can be varied easily from about 10% to full power at the 110-volt level.

The two networks comprising elements 32, 34, 36 and 38, 40, 42 respectively are the equalizing means that permits the use of a low voltage rated SCR 24 to operate in a power circuit containing a higher voltage. This is accomplished by placing the power diode 30 in series with the SCR 24 as shown in the schematic.

Because the forward leakage just prior to conduction through SCR 24 as well as diode 30 is different from the back resistance on the reverse cycle of voltage, two networks are required to ensure proper voltage division across both. On the forward cycle, just prior to conduction diode 32 conducts and resistors 34 and 36 are proportioned to distribute the applied voltage across power diode 30 and SCR 24 in accordance with their respective voltage ratings. This is a well-known method of voltage equalization previously mentioned.

The other network consisting of diode 38, resistors 40 and 42 is substantially inoperative because diode 38 is non-conducting. On the reverse cycle of applied voltage, diode 38 becomes conducting, and resistors 40 and 42 form the equalizing network for the reverse voltage condition. The other network, namely, diode 32 and resistors 34 and 36 is ineffectual because diode 32 is back-biased. Thus the two conditions for forward and backward equalization are effectively performed.

Inductance 44 and capacitors 46 and 48 form a low pass filter circuit. The purpose of this filter is two-fold, namely to prevent surges and voltage spikes on the power line from causing false firing of the SCR during its normal functioning, and to prevent the surges of power generated by the electric power converter 10 from being transferred back to the power line and hence possibly causing radio frequency interference to sensitive radio receiving equipment which might be in operation on the power source line.

For power ratings of several hundred watts, this filter may not be necessary. For power outputs in excess of about 500 watts there may be instances where the filter may be desirable or necessary.

What is claimed is:
1. In a gated silicon controlled rectifier regulator for reducing line voltage of a line source to a load, a serial connection of a silicon controlled rectifier with said load, a phase shifter means, a trigger means connected between the control electrode of said silicon controlled rectifier and said phase shifter means, a voltage sharing diode means further serially connected in said serial connection of said silicon controlled rectifier and said load for sharing with said silicon controlled rectifier the voltage drop during its conductive periods, a pair of networks each comprising a resistor means, shunted by a serially connected second resistor means and second diode, the first of said networks shunting the silicon controlled rectifier, with the second of said networks shunting said voltage sharing diode means, and with the diode of the first said network poled oppositely to the poling of said silicon controlled rectifier and said load sharing diode means.

2. In a gated silicon controlled rectifier regulator as recited in claim 1, and where said trigger means comprises a neon tube to further serve as a pilot light.

3. In a gated silicon controlled rectifier regulator as recited in claim 1, and where said phase shifter means is adjustable to serve as an adjustable voltage control.

4. In a gated silicon controlled rectifier regulator as recited in claim 1, first resistance means, said first resistance means shunting said voltage sharing diode, second resistance means, said second resistance means shunting said connection of said silicon controlled rectifier with said load, diode means in each said respective first and second resistance means, and additionally other diode means between said phase shifter means and said trigger means.

References Cited
UNITED STATES PATENTS

| | | |
|---|---|---|
| 3,161,759 | 12/1964 | Gambill et al. |
| 3,201,617 | 8/1965 | Pacoroni _____ 307—146 |
| 3,241,043 | 3/1966 | Clarke. |
| 3,275,802 | 9/1966 | Vandivere. |
| 3,284,666 | 11/1966 | Hajicek _____ 315—194 X |
| 3,299,341 | 1/1967 | Corey. |

OTHER REFERENCES
GE SCR Manual, "Neon Lamp Trigger Circuits," 3rd edition, 1964, p. 139.

JOHN F. COUCH, *Primary Examiner.*

A. D. PELLINEN, *Assistant Examiner.*

U.S. Cl. X.R.

307—146; 315—194, 200; 323—36